US008247084B2

(12) United States Patent
Kimura et al.

(10) Patent No.: US 8,247,084 B2
(45) Date of Patent: Aug. 21, 2012

(54) ALUMINUM ALLOY BRAZING SHEET

(75) Inventors: Shimpei Kimura, Moka (JP); Toshiki Ueda, Moka (JP); Takahiro Izumi, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/099,695

(22) Filed: May 3, 2011

(65) Prior Publication Data

US 2011/0287277 A1 Nov. 24, 2011

(30) Foreign Application Priority Data

May 18, 2010 (JP) ................................ 2010-114029
May 18, 2010 (JP) ................................ 2010-114030

(51) Int. Cl.
*B32B 15/20* (2006.01)
*F28F 21/08* (2006.01)

(52) U.S. Cl. .... 428/654; 148/535; 165/905; 228/262.51

(58) Field of Classification Search ........................ None
See application file for complete search history.

(56) References Cited

U.S. PATENT DOCUMENTS 5,011,547 A 4/1991 Fujimoto et al.
2005/0079376 A1* 4/2005 Benedictus et al. .......... 428/654
2009/0020276 A1* 1/2009 Ueda et al. .................... 165/177
2009/0165901 A1 7/2009 Koshigoe et al.
2010/0101688 A1* 4/2010 Koshigoe et al. ............. 148/535
2010/0112370 A1* 5/2010 Ueda et al. .................... 428/576
2010/0183897 A1* 7/2010 Kobayashi et al. ........... 428/654
2011/0014494 A1* 1/2011 Matsumoto et al. .......... 428/654
2011/0027610 A1 2/2011 Tatsumi et al.
2011/0236717 A1 9/2011 Ueda et al.
2011/0240280 A1 10/2011 Izumi et al.
2011/0287276 A1 11/2011 Izumi et al.

FOREIGN PATENT DOCUMENTS

JP 2564190 9/1996
JP 3276790 2/2002
JP 2009-074138 * 4/2009
WO WO 2009101896 A1 * 8/2009

OTHER PUBLICATIONS

Metals Handbook, 8th edition, vol. 8, Metallography, Structures and Phase Diagrams, T. Lyman (ed.), American Society for Metals (1973), pp. 265, 397-399.*

* cited by examiner

*Primary Examiner* — John J Zimmerman
(74) *Attorney, Agent, or Firm* — Oblon, Spivak, McClelland, Maier & Neustadt, L.L.P.

(57) ABSTRACT

An aluminum alloy brazing sheet includes a core material containing Si, Cu and Mn by a predetermined amount, the balance being Al and inevitable impurities, a sacrificial anode material disposed on one face side of the core material and containing Si, Zn and Mg by a predetermined amount, the balance being Al and inevitable impurities, and a brazing filler material disposed on the other face side of the core material and formed of an aluminum alloy, and the area fraction of Zn—Mg-based intermetallic compounds with 2.0 μm or above particle size on the surface of the sacrificial anode material may be 1.0% or below. Or otherwise, in the aluminum alloy brazing sheet, the number density of Al—Cu-based intermetallic compounds with 0.5 μm or above particle size inside the core material may be 1.0 piece/$\mu m^2$ or below.

10 Claims, No Drawings

ALUMINUM ALLOY BRAZING SHEET

BACKGROUND OF THE INVENTION

1. Field of the Invention

The present invention relates to an aluminum alloy brazing sheet used for a heat exchanger of an automobile and the like.

2. Description of the Related Art

As a raw material for a heat exchanger of an automobile and the like, a variety of aluminum alloy brazing sheets (may be hereinafter simply referred to as "brazing sheet") disposed with a brazing filler material and a sacrificial anode material on one face or both faces of a core material are generally used. In the past, as the core material for the brazing sheet, Al—Mn-based aluminum alloy 3003 was used, however the brazing sheet using the core material had not sufficient post-braze strength and corrosion resistance.

Therefore, technologies for improving the post-braze strength and corrosion resistance of the brazing sheet have been proposed. For example, there is a technology improving the post-braze strength without deteriorating the brazability of a brazing sheet by adding a predetermined amount of Mg to a sacrificial anode material of the brazing sheet (for example, Japanese Patent No. 2564190; see the column in the right in p. 2). More specifically, according to the technology, Mg added to the sacrificial anode material and Si present in the brazing filler material migrate into the core material in heating for brazing and $Mg_2Si$ is generated inside the core material, thereby the post-braze strength of the brazing sheet is improved and deterioration of the brazability is avoided because Mg added to the sacrificial anode material does not reach the brazing filler material.

Also, there is a technology improving the post-braze strength and corrosion resistance of a brazing sheet by adding a predetermined amount of Cu to a core material of the brazing sheet and making the sacrificial anode material of a predetermined thickness while adding a predetermined amount of Zn to a sacrificial anode material (for example, Japanese Patent No. 3276790; see the paragraph 0013). More specifically, according to the technology, the corrosion resistance is improved by Zn added to the sacrificial anode material and making the sacrificial anode material of a predetermined thickness, and the post-braze strength is improved by strengthening of solid solution by Cu added to the core material.

However, the requirement on the heat exchanger of an automobile and the like in recent years extends not only to improvement of the post-braze strength and corrosion resistance as described above but also to size reduction and weight reduction. In order to meet the requirements of the size reduction and weight reduction, the thickness of the material of the heat exchanger should be reduced, however the strength and corrosion resistance are deteriorated as the thickness of the material of the heat exchanger is reduced. In addition, thinner gauge down of the material of the heat exchanger becomes a cause of generating welding defect in high frequency welding.

SUMMARY OF THE INVENTION

The present invention has been developed in view of such circumstances, and its object is to provide an aluminum alloy brazing sheet for a heat exchanger good in the post-braze strength and corrosion resistance as well as good in the high frequency weldability.

The present inventor carried out intensive experiments and studies with respect to causes improving the high frequency weldability of a brazing sheet. As a result, it was found out that the area fraction of Zn—Mg-based intermetallic compounds of the sacrificial anode material of the brazing sheet or the number density of Al—Cu-based intermetallic compounds inside the core material of the brazing sheet is in correlation with the high frequency weldability of the brazing sheet, and that the high frequency weldability of the brazing sheet is improved by lowering the area fraction of the Zn—Mg-based intermetallic compounds or the number density of the Al—Cu-based intermetallic compounds.

That is, in order to solve the problems described above, an aluminum alloy brazing sheet in relation with the present invention includes a core material containing Si: 0.1-1.0 mass %, Cu: 0.5-1.2 mass %, and Mn: 0.5-2.0 mass %, the balance being Al and inevitable impurities, a sacrificial anode material disposed on one face side of the core material and containing Si: exceeding 0.2 mass % and 0.8 mass % or below, Zn: exceeding 3.0 mass % and 5.0% or below, and Mg: 1.0-4.5 mass %, the balance being Al and inevitable impurities, and a brazing filler material disposed on the other face side of the core material and formed of an aluminum alloy, and the area fraction of Zn—Mg-based intermetallic compounds with 2.0 μm or above particle size on the surface of the sacrificial anode material is 1.0% or below. Also, in an aluminum alloy brazing sheet in relation with another aspect of the present invention, the number density of Al—Cu-based intermetallic compounds with 0.5 μm or above particle size inside the core material may be 1.0 piece/$\mu m^2$ or below. Further, in an aluminum alloy brazing sheet in relation with further other aspect of the present invention, the core material may further contain one or more element selected from a group consisting of Ti: 0.05-0.25 mass %, Cr: 0.25 mass % or below, and Mg: 0.5 mass % or below.

With such constitution, the post-braze strength, brazability and corrosion resistance of the aluminum alloy brazing sheet can be improved by making the core material and the sacrificial anode material of a predetermined composition. Also, by limiting the number density of the Zn—Mg-based intermetallic compounds on the surface of the sacrificial anode material or the Al—Cu-based intermetallic compounds inside the core material, melting in high frequency welding can be stabilized.

According to the aluminum alloy brazing sheet for a heat exchanger in relation with the present invention, the high frequency weldability can be improved by stabilizing melting in high frequency welding while improving the post-braze strength, brazability and corrosion resistance.

DESCRIPTION OF THE PREFERRED EMBODIMENTS

Below, an aluminum alloy brazing sheet in relation with the present embodiment will be discussed in detail.

{Aluminum Alloy Brazing Sheet}

An aluminum alloy brazing sheet is a sheet material used for a heat exchanger and the like for an automobile and the like, and is constructed of a core material, a sacrificial anode material roll bonded to one side face of the core material, and a brazing filler material roll bonded to the other side face of the core material.

Below, the core material, sacrificial anode material and brazing filler material will be discussed.

{Core Material}

The core material contains Si: 0.1-1.0 mass %, Cu: 0.5-1.2 mass %, and Mn: 0.5-2.0 mass %, with the balance being Al and inevitable impurities.

Also, it is preferable that the core material further contains one or more element selected from a group consisting of Ti: 0.05-0.25 mass %, Cr: 0.25 mass % or below, and Mg: 0.5 mass % or below, in addition to the above-mentioned compositions (Si, Cu, Mn).

(Si of Core Material: 0.1-1.0 Mass %)

Si forms intermetallic compounds along with Al, Mn, is finely distributed intergranular to contribute to dispersion strengthening, and improves the strength.

When Si content is below 0.1 mass %, the post-braze strength lowers. On the other hand, when Si content exceeds 1.0 mass %, the solidus temperature of the core material lowers, and therefore the core material is molten in heating for brazing. Accordingly, Si amount contained in the core material is to be within the range described above.

(Cu of Core Material: 0.5-1.2 Mass %)

Cu has an effect of improving the post-braze strength, the potential becomes noble by adding Cu, and the potential difference with respect to the sacrificial anode material increases, and therefore corrosion resistance is improved.

When Cu content is below 0.5 mass %, the post-braze strength lowers, and the potential difference with respect to the sacrificial anode material cannot be secured, therefore the inside corrosion resistance deteriorates. On the other hand, when Cu content exceeds 1.2 mass %, the solidus temperature of the core material lowers, and therefore the core material is molten in heating for brazing. Accordingly, Cu amount contained in the core material is to be within the range described above.

(Mn of Core Material: 0.5-2.0 Mass %)

Mn has an effect of improving the post-braze strength.

when Mn Content is below 0.5 mass %, the number of the intermetallic compounds formed along with Al, Si decreases, and the post-braze strength lowers. On the other hand, when Mn content exceeds 2.0 mass %, coarse intermetallic compounds are formed in casting, and the workability and corrosion resistance deteriorate. Accordingly, Mn amount contained in the core material is to be within the range described above.

(Ti of Core Material: 0.05-0.25 Mass %)

Ti is distributed in layered form in the core material and greatly improves the corrosion resistance of the inner surface and the outer surface.

When Ti content is below 0.05 mass %, the corrosion resistance cannot be improved sufficiently. On the other hand, when Ti content exceeds 0.25 mass %, coarse intermetallic compounds are formed in casting, and the workability and corrosion resistance deteriorate. Accordingly, Ti amount contained in the core material is to be within the range described above.

(Cr of Core Material: 0.25 Mass % or Below)

Cr forms intermetallic compounds inside the core material and has an effect of improving the post-braze strength.

When Cr content exceeds 0.25 mass %, coarse intermetallic compounds are formed in casting, and the workability and corrosion resistance deteriorate. Accordingly, Cr amount contained in the core material is to be within the range described above.

(Mg of Core Material: 0.5 Mass % or Below)

Mg forms fine precipitated phase of $Mg_2Si$ along with Si, and improves the strength.

When Mg content exceeds 0.5 mass %, flux and Mg react with each other in brazing using non-corrosive flux, and brazing cannot be performed. Accordingly, Mg amount contained in the core material is to be within the range described above.

(Balance of Core Material: Al and Inevitable Impurities)

The composition of the core material is composed of the balance of Al and inevitable impurities in addition to the above. Also, Fe, Zr and the like, for example, can be cited for the inevitable impurities. When the content thereof is 0.2 mass % or below respectively, the effect of the present invention is not hindered, and containment in the core material is allowed.

(Number Density of Al—Cu-Based Intermetallic Compounds Inside Core Material)

By making the number density of the Al—Cu-based intermetallic compounds with 0.5 μm or above particle size 1.0 piece/$\mu m^2$ or below, melting in high frequency welding can be stabilized, and as a result of it, welding can be performed excellently. On the other hand, when the number density of the Al—Cu-based intermetallic compounds with 0.5 μm or above particle size exceeds 1.0 piece/$\mu m^2$, the position where the Al—Cu-based intermetallic compounds are present is molten excessively locally in high frequency welding, butting condition is destabilized, and a welding failure is liable to occur. Also, the Al—Cu-based intermetallic compounds with the particle size of below 0.5 μm hardly affect the welding failure.

Here, the particle size means the maximum diameter.

In order to make the number density of the Al—Cu-based intermetallic compounds with 0.5 μm or above particle size present inside the core material 1.0 piece/$\mu m^2$ or below as required above, and in order to secure the formability in high frequency welding, the conditions of intermediate annealing performed between cold rolling and final cold rolling and of final annealing performed after final cold rolling should be controlled. The detail of the conditions will be discussed hereinafter.

Also, the number density of the Al—Cu-based intermetallic compounds can be measured by manufacturing a sample for observing the center part of the core material by, for example, mechanical polishing and electrolytic etching, and observing the structure using a transmission electron microscope.

{Sacrificial Anode Material}

The sacrificial anode material is disposed on one face side of the core material and contains Si: exceeding 0.2 mass % and 0.8 mass % or below, Zn: exceeding 3.0 mass % and 5.0 mass % or below, and Mg: 1.0-4.5 mass %, with the balance being Al and inevitable impurities.

Also, the area fraction of the Zn—Mg-based intermetallic compounds with 2.0 μm or above particle size on the surface of the sacrificial anode material is 1.0% or below.

(Si of Sacrificial Anode Material: Exceeding 0.2 Mass % and 0.8 Mass % or Below)

Si forms a fine precipitated phase of $Mg_2Si$ along with Mg and improves the strength.

When Si content is 0.2 mass % or below, the effect of precipitation of $Mg_2Si$ is less. On the other hand, when Si content exceeds 0.8 mass %, the solidus temperature of the sacrificial anode material lowers, and therefore the sacrificial anode material is molten in heating for brazing. Accordingly, Si amount contained in the sacrificial anode material is to be within the range described above.

(Zn of Sacrificial Anode Material: Exceeding 3.0 Mass % and 5.0 Mass % or Below)

Zn is an element making the potential less noble, and has an effect of securing the potential difference against the core material by adding to the sacrificial anode material and improving the inside corrosion resistance.

When Zn content is 3.0 mass % or below, the potential difference against the core material is reduced, and the inside corrosion resistance deteriorates. On the other hand, when Zn content exceeds 5.0 mass %, the solidus temperature of the sacrificial anode material lowers and the sacrificial anode material is molten in heating for brazing. Accordingly, Zn amount contained in the sacrificial anode material is to be within the range described above.

(Mg of Sacrificial Anode Material: 1.0-4.5 Mass %)

Mg forms a fine precipitated phase of $Mg_2Si$ along with Si and improves the strength.

When Mg content is below 1.0 mass %, the effect of precipitation of $Mg_2Si$ is less, and the strength is not improved sufficiently. On the other hand, when Mg content exceeds 4.5 mass %, the good clad bonding performance lowers and it becomes hard to clad the side material on the core material. Accordingly, Mg amount contained in the sacrificial anode material is to be within the range described above.

(Balance of Sacrificial Anode Material: Al and Inevitable Impurities)

The composition of the sacrificial anode material is composed of the balance of Al and inevitable impurities in addition to the above. Also, Mn, Cr, Zr, Fe, In, Sn and the like, for example, can be cited for the inevitable impurities. When Mn content is below 0.05 mass %, Cr and Zr content is 0.2 mass % or below respectively, Fe content is 0.25 mass % or below, and In and Sn content is 0.1 mass % or below respectively, the effect of the present invention is not hindered, and containment in the sacrificial anode material is allowed.

(Area Fraction of Zn—Mg-based Intermetallic Compounds on the Surface of Sacrificial Anode Material)

By making the area fraction of the Zn—Mg-based intermetallic compounds with 2.0 μm or above particle size 1.0% or below, melting in high frequency welding can be stabilized, and as a result of it, welding can be performed excellently. On the other hand, when the area fraction of the Zn—Mg-based intermetallic compounds with 2.0 μm or above particle size exceeds 1.0%, the position where the Zn—Mg-based intermetallic compounds are present is molten excessively locally in high frequency welding, butting condition is destabilized, and a welding failure is liable to occur. Also, the Zn—Mg-based intermetallic compounds with the particle size of below 2.0 μm hardly affect the welding failure.

Here, the particle size means the maximum diameter. Also, the surface of the sacrificial anode material means the surface on the side other than the side where the core material is disposed.

In order to make the area fraction of the Zn—Mg-based intermetallic compounds with 2.0 μm or above particle size present on the surface of the sacrificial anode material 1.0% or below as required above, and in order to secure the formability in high frequency welding, the condition of final annealing performed after final cold rolling should be controlled. The detail of the condition will be discussed hereinafter.

Also, the area fraction of the Zn—Mg-based intermetallic compounds can be measured by, for example, polishing the surface of the sacrificial anode material and observing the surface by a scanning electron microscope. However, by the scanning electron microscope, the Fe-based intermetallic compounds contained in the impurities level cannot be distinguished from the Zn—Mg-based intermetallic compounds. Therefore, utilizing the characteristic that generally all of the Zn—Mg-based intermetallic compounds are generated in final annealing after final cold rolling and the characteristic that the Fe-based intermetallic compounds do not transform in intermediate annealing and in final annealing after final cold rolling, the material before finial annealing and the material after final annealing were observed by the scanning electron microscope respectively. Also, by obtaining the difference between the area fraction of the Fe-based intermetallic compounds and the Zn—Mg-based intermetallic compounds after final annealing and the area fraction of the Fe-based intermetallic compounds before final annealing, the area fraction of only the Zn—Mg-based intermetallic compounds can be obtained.

{Brazing Filler Material}

The brazing filler material is disposed on the other face side of the core material and is formed of an aluminum alloy. As the aluminum alloy, common alloys such as 4343, 4045 and the like stipulated in JIS can be cited for example. Also, the aluminum alloy also includes an alloy containing Zn in addition to an alloy containing Si. That is, as the aluminum alloy, Al—Si-based alloy or Al—Si—Zn-based alloy can be cited. Also, for example, an Al—Si-based alloy containing Si: 7-12 mass % can be used.

When Si content is below 7 mass %, Al—Si liquid phase amount at the brazing temperature is less, and the brazability is liable to deteriorate. On the other hand, when Si content exceeds 12 mass %, coarse primary crystal of Si increases in casting the brazing filler material, therefore excessive melting in the boundary between the core material and the brazing filler material is liable to occur in manufacturing the brazing sheet, and the post-braze strength and corrosion resistance are liable to be deteriorated.

However the brazing filler material is not particularly limited, and may be any Al-based (Al—Si-based, Al—Si—Zn-based) alloys commonly used. Further, it is also possible to use Al—Si—Mg-based and Al—Si—Mg—Bi-based alloys used for vacuum brazing. Furthermore, Fe, Cu, Mn and the like can be contained in addition to Si, Zn, Mg and Bi.

Next, a method for manufacturing an aluminum alloy brazing sheet in relation with the present embodiment will be discussed.

{Method for Manufacturing Aluminum Alloy Brazing Sheet}

First, a core material, sacrificial anode material and brazing filler material which are the materials for an aluminum alloy brazing sheet are manufactured. The method for manufacturing the core material, sacrificial anode material and brazing filler material is not limited in particular. The core material can be manufactured by, for example, casting the aluminum alloy for core material with the composition described above at a predetermined casting temperature, thereafter scalping an ingot obtained into a desired thickness, and performing homogenizing heat treatment. Also, the aluminum alloy for sacrificial anode material and the aluminum alloy for brazing filler material with the compositions described above are casted at a predetermined casting temperature, thereafter an ingot obtained is scalped into a desired thickness, and homogenizing heat treatment is performed. Further, by performing hot rolling into a predetermined sheet thickness, the sacrificial anode material and the brazing filler material can be manufactured.

Thereafter, the sacrificial anode material is overlaid on one side face of the core material, the brazing filler material is overlaid on the other side face, hot rolling is performed, and thereby each of them are roll bonded with each other to be made the sheet material. Further, the sheet material is subjected to cold rolling, intermediate annealing, final cold rolling, and final annealing, and thereby the aluminum alloy brazing sheet is manufactured.

(On Condition of Final Annealing)

The final annealing described above should be performed in the conditions of the treatment temperature of 250° C. or above and 500° C. or below, the retention time of 10 hours or below, and the cooling rate thereafter of 5° C./min or above.

By performing final annealing according to the condition, the area fraction of the Zn—Mg-based intermetallic compounds with 2.0 μm or above particle size present on the surface of the sacrificial anode material can be made 1.0% or below as described above.

When the temperature of final annealing is below 250° C., the effect of relaxing the working strain in rolling as an annealing treatment cannot be secured, and formability also deteriorates. Further, when the temperature of final annealing exceeds 500° C. or the time for final annealing exceeds 10 hours, the Zn—Mg-based intermetallic compounds grow coarsely, and the area fraction of the intermetallic compounds with 2.0 μm or above particle size exceeds 1.0%. Also, migration is promoted by heat treatment at a high temperature and for long hours, which not only exerts adverse influence on other characteristics but also hinders the productivity, and therefore, from the viewpoint of securing overall characteristics of the material, the condition of 450° C. or below and 10 hours or below is preferable. More preferable temperature range for treatment is 310° C.-450° C. Further, when the cooling rate is below 5° C./min, the Zn—Mg-based intermetallic compounds are coarsened in the cooling step, and the area fraction of the metallic compounds with 2.0 μm or above particle size exceeds 1.0%.

(On Condition of Intermediate Annealing)

The condition of the intermediate annealing described above should be retaining for less than 1 s at the maximum attaining temperature of 350° C.-550° C., and cooling with 1° C./s or above cooling rate thereafter. By performing intermediate annealing according to the condition, the number density of the Al—Cu-based intermetallic compounds with 0.5 μm or above particle size present inside the core material can be made 1.0 piece/μm$^2$ or below.

Also, when the maximum attaining temperature of intermediate annealing is below 350° C., a solution heat treatment becomes insufficient and the coarse Al—Cu-based intermetallic compounds crystallized in casting do not enter into solid solution sufficiently and remain, and therefore the number density of the Al—Cu-based intermetallic compounds with 0.5 μm or above particle size present inside the core material exceeds 1.0 piece/μm$^2$. On the other hand, when the maximum attaining temperature exceeds 550° C., the brazing filler material may be molten in intermediate annealing. Also, when the retention time of the maximum attaining temperature in intermediate annealing is 1 s or above, recrystallized grains of the core material are coarsened, and the weld cracking in high frequency welding is liable to occur. Further, when the cooling rate is below 1° C./s, the Al—Cu-based intermetallic compounds precipitate in cooling, and the number density of the Al—Cu-based intermetallic compounds with 0.5 μm or above particle size present inside the core material exceeds 1.0 piece/μm$^2$.

(On Condition of Final Annealing)

The final annealing described above is to be performed at the treatment temperature of 200° C. or above and 400° C. or below with the retention time of 10 hours or below, and cooling thereafter at 30° C./hr or above cooling rate. By performing final annealing according to the condition, the number density of the Al—Cu-based intermetallic compounds with 0.5 μm or above particle size present inside the core material can be made 1.0 piece/μm$^2$ or below.

In this case, when the temperature of final annealing is below 200° C., the effect of relaxing the working strain in rolling as an annealing treatment cannot be secured. On the other hand, when the temperature of final annealing exceeds 400° C., the heat treatment category becomes that of the material 0, recrystallized grains of the core material are not coarsened in heating for brazing, and therefore molten solder erodes the core material extremely greatly. Also, when the time of final annealing treatment exceeds 10 hours, the Al—Cu-based intermetallic compounds grow, and the number density of the Al—Cu-based intermetallic compounds with 0.5 μm or above particle size exceeds 1.0 piece/μm$^2$. Further, when the cooling rate is below 30° C./hr, the Al—Cu-based intermetallic compounds are coarsened in the cooling step, and the number density of the Al—Cu-based intermetallic compounds with 0.5 μM or above particle size exceeds 1.0 piece/μm$^2$.

EXAMPLE A

Next, with respect to the aluminum alloy brazing sheet in relation with the present invention, the example satisfying the requirements of the present invention and the comparative example not satisfying the requirements of the present invention will be compared and described in detail.

(Manufacturing of Core Material)

The ingots of the aluminum alloys for core material of S1-S23 having the composition illustrated in Table 1 were made by a continuous casting method, scalping and homogenizing treatment were performed according to necessity, and the ingots for core material were obtained.

(Manufacturing of Sacrificial Anode Material)

The ingots of the aluminum alloys for the sacrificial anode material of G1-G13 having the composition illustrated in Table 2 were made by a continuous casting method, were subjected to scalping and homogenizing treatment according to necessity, were hot rolled to a predetermined sheet thickness, and were made the sheet materials for the sacrificial anode material.

(Manufacturing of Brazing Filler Material)

The ingots of the aluminum alloys for brazing filler material of R1-R3 having the composition illustrated in Table 3 were made by a continuous casting method, were subjected to scalping and homogenizing treatment according to necessity, were hot rolled to a predetermined sheet thickness, and were made the sheet materials for the brazing filler material.

(Manufacturing of Aluminum Alloy Brazing Sheet)

Either sheet material for sacrificial anode material among G1-G13 was overlaid on one side face of either sheet material for core material among S1-S23 manufactured so that the clad ratio became 15%, either sheet material for brazing filler material among R1-R3 was overlaid on the other side face of the sheet material for core material so that the clad ratio became 15%, and were roll bonded by hot rolling to be made the sheet material. Thereafter, the sheet material was subjected to cold rolling, intermediate annealing, final cold rolling, and final annealing, and were made the sheet material with 0.25 mm sheet thickness.

Also, final annealing was performed in accordance with the conditions illustrated in Tables 4 and 5.

Next, the aluminum alloy brazing sheets manufactured by the above-mentioned method were made specimens, the area fraction [%], high frequency weldability, post-braze strength, brazability, and corrosion resistance of the Zn—Mg-based intermetallic compounds of the specimens were measured and evaluated in accordance with the method described below, and the results of them were illustrated in Tables 4 and 5.

Also, in Tables 4 and 5, those on which measurement and evaluation were impossible and those on which measurement and evaluation were not conducted were shown by "-".

Further, in the present example, those evaluated to be good with respect to all of the evaluation points were determined to be the example satisfying the requirements of the present invention, whereas those evaluated to be poor with respect to at least either one of the evaluation points were determined to be the comparative example not satisfying the requirements of the present invention.

(Area Fraction of Zn—Mg-Based Intermetallic Compounds)

The area fraction of the Zn—Mg-based intermetallic compounds was measured by polishing the surface of the sacrificial anode material and observing the surface by a scanning electron microscope. More specifically, the specimen before final annealing and the specimen after final annealing were observed respectively by the scanning electron microscope. Also, by obtaining the difference between the area fraction of the Fe-based and Zn—Mg-based intermetallic compounds after final annealing and the area fraction of the Fe-based intermetallic compounds before final annealing, the area fraction of only the Zn—Mg-based intermetallic compounds was obtained.

Also, the area fraction is "(total area of Zn—Mg-based intermetallic compounds with 2.0 μm or above particle size in the observed location/total observed area)×100".

(Evaluation of High Frequency Weldability)

The aluminum alloy brazing sheet manufactured in accordance with the method described above was subjected to slitting work using a commonly used slitter device so that the width of the strip material became 35 mm, and was wound into a coil. The strip material thus obtained was worked into a high-frequency-welded tube by a high-frequency-welded tube manufacturing device, and a flat tube with 16 mm major axis and 2 mm minor axis was obtained.

The high frequency weldability was evaluated by visual inspection of a 100 m portion of the high-frequency-welded tube obtained and confirming presence/absence of non-welded portion of 5 mm or above in the longitudinal direction.

The case in which there was no non-welded portion of 5 mm or above was evaluated to be good in weldability. On the other hand, the case in which there was one or more non-welded portion of 5 mm or above was evaluated to be poor in weldability.

(Evaluation of Post-braze Strength)

After the specimen was brazed by a drop test method (after heating for 5 min at 600° C. temperature in the nitrogen atmosphere with oxygen content of 200 ppm or below and with −40° C. dew point), the specimen was worked into a JIS No. 5 test piece (3 pieces were manufactured for each specimen). After the test piece was left for one week at room temperature (25° C.), the post-braze strength was measured by a tensile test. Those with 170 MPa or above average value of the post-braze strength of three test pieces were evaluated to be good, whereas those with below 170 MPa average value were evaluated to be poor. Also, evaluation of the post-braze strength was conducted only for those whose evaluation result on the high frequency weldability was good.

(Evaluation of Brazability)

A test piece with the size of 25 mm width and 60 mm length was cut from the specimen, was coated with non-corrosive flux FL-7 (manufactured by Morita Chemical Industries Co., Ltd.) by 5 g/m$^2$ on the brazing filler material surface of the test piece, and was dried.

The test piece was placed so that the brazing filler material surface coated with the flux faces upward, and a 3003 alloy sheet with 25 mm width×55 mm length of 1 mm thickness was erected vertically with respect to the test piece on top thereof with a round bar made of stainless steel with 2 mm diameter being placed in between as a spacer and was fixed by a wire. At that time, the position of the spacer was 50 mm apart from one end of the test piece. Then brazing (heating for 5 min at 600° C. temperature in the nitrogen atmosphere with oxygen content of 200 ppm or below and with −40° C. dew point) was performed.

The length of a fillet filled in the gap between the test piece and the 3003 alloy sheet was measured. Those with 30 mm or above fillet length were evaluated to be good in the brazability, whereas those with the fillet length of below 30 mm were evaluated to be poor in the brazability.

Also, evaluation of the brazability was conducted only for those whose evaluation result on both of the high frequency weldability and post-braze strength was good.

(Evaluation of Corrosion Resistance)

After the specimen was brazed by a drop test method (after heating for 5 min at 600° C. temperature in the nitrogen atmosphere with oxygen content of 200 ppm or below and with −40° C. dew point), the specimen was cut into the size of 50 mm width×60 mm length. Also, the brazing filler material surface was covered by a whole-surface seal of a masking seal with the size of 60 mm width×70 mm length, portions of 5 mm from respective edges of the sacrificial anode material were also covered by the seal by folding back the seal to the sacrificial anode material surface side, and thereby the test piece was manufactured.

The test piece was subjected to the corrosion test in which the cycle of immersing (88° C.×8 hours) in a test liquid containing $Na^+$: 118 ppm, $Cl^-$: 58 ppm, $SO_4^{2-}$: 60 ppm, $Cu^{2+}$: 1 ppm, $Fe^{3+}$: 30 ppm, naturally cooling to the room temperature after immersing, and retaining for 16 hours at the room temperature was repeated by 90 cycles.

The corrosion condition was visually inspected, and the test pieces with 50 μm or below maximum corrosion depth were evaluated to be good, whereas the test pieces whose maximum corrosion depth exceeded 50 μm were determined to be poor.

Also, evaluation of the corrosion resistance was conducted only for those whose evaluation result on all of the high frequency weldability, post-braze strength and brazability was good.

As illustrated in Table 4, the brazing sheets of the examples of Nos. 1-20 satisfied the requirements of the present invention, and were therefore evaluated to be good in the high frequency weldability, post-braze strength, brazability and corrosion resistance. On the other hand, as illustrated in Table 5, the brazing sheets of the comparative examples of Nos. 1-20 did not satisfy either of the requirements stipulated in the present invention, and therefore were not evaluated to be good.

More specifically, in the brazing sheets of the comparative examples of Nos. 1-3, because the area fraction of the Zn—Mg-based intermetallic compounds with 2.0 μm or above particle size present on the surface of the sacrificial anode material exceeded 1.0%, local excessive melting occurred in high frequency welding, and the high frequency weldability resulted to be poor.

In the brazing sheet of the comparative example No. 4, because Si in the core material was below 0.1 mass %, the post-braze strength was low. Also, in the brazing sheet of the comparative example No. 5, because Si in the core material exceeded 1.0 mass %, the core material was molten in heating for brazing, and the post-braze strength could not be measured.

In the brazing sheet of the comparative example No. 6, because Cu in the core material was below 0.5 mass %, the post-braze strength was low. Also, in the brazing sheet of the comparative example No. 7, because Cu in the core material exceeded 1.2 mass %, the core material was molten in heating for brazing, and the post-braze strength could not be measured.

In the brazing sheet of the comparative example No. 8, because Mn in the core material was below 0.5 mass %, the post-braze strength was low. Also, in the brazing sheet of the comparative example No. 9, because Mn in the core material exceeded 2.0 mass %, the corrosion resistance resulted to be poor.

In the brazing sheet of the comparative example No. 10, because Cr in the core material exceeded 0.25 mass %, the corrosion resistance resulted to be poor.

In the brazing sheet of the comparative example No. 11, because Ti in the core material was below 0.05 mass %, the corrosion resistance resulted to be poor. Also, in the brazing sheet of the comparative example No. 12, because Ti in the core material exceeded 0.25 mass %, the corrosion resistance resulted to be poor.

In the brazing sheet of the comparative example No. 13, because Mg in the core material exceeded 0.5 mass %, the brazability resulted to be poor.

In the brazing sheet of the comparative example No. 14, because Si in the sacrificial anode material was 0.2 mass % or below, the post-braze strength was low. Also, in the brazing sheet of the comparative example No. 15, because Si in the sacrificial anode material exceeded 0.8 mass %, the sacrificial anode material was molten in heating for brazing, and the post-braze strength could not be measured.

In the brazing sheet of the comparative example No. 16, because Zn in the sacrificial anode material was below 3.0 mass %, the corrosion resistance resulted to be poor. Also, in the brazing sheet of the comparative example No. 17, because Zn in the sacrificial anode material exceeded 5.0 mass %, the sacrificial anode material was molten in heating for brazing, and the post-braze strength could not be measured.

In the brazing sheet of the comparative example No. 18, because Mg in the sacrificial anode material was below 1.0 mass %, the post-braze strength was low. Also, in the brazing sheet of the comparative example No. 19, because Mg in the sacrificial anode material exceeded 4.5 mass %, the side material could not be claded on the core material, and therefore the test could not be conducted.

In the brazing sheet of the comparative example No. 20, because Cu in the core material was below 0.5 mass % and Zn in the sacrificial anode material exceeded 5.0 mass %, the sacrificial anode material was molten in heating for brazing, and the post-braze strength could not be measured.

Also, the brazing sheets of the comparative examples of Nos. 7 and 20 are those assuming the conventional brazing sheets described in Japanese Patent No. 3276790 (see the paragraph 0013) or Japanese Patent No. 2564190 (see the column in the right in p. 2). As shown in the present example, these conventional brazing sheets do not satisfy a predetermined level with respect to one or more among the post-braze strength, brazability, corrosion resistance, and high frequency weldability. Accordingly, it was clarified objectively by the present example that the brazing sheets in relation with the present invention were superior in comparison with the conventional brazing sheets.

EXAMPLE B

Next, with respect to the aluminum alloy brazing sheet in relation with the present invention, the example satisfying the requirements of the present invention and the comparative example not satisfying the requirements of the present invention will be compared and described specifically.

(Manufacturing of Core Material)

The ingots of the aluminum alloys for core material of S101-S123 having the composition illustrated in Table 11 were made by a continuous casting method, scalping and homogenizing treatment were performed according to necessity, and the ingots for core material were obtained.

(Manufacturing of Sacrificial Anode Material)

The ingots of the aluminum alloys for sacrificial anode material of G101-G113 having the composition illustrated in Table 12 were made by a continuous casting method, were subjected to scalping and homogenizing treatment according to necessity, were hot rolled to a predetermined sheet thickness, and were made the sheet materials for the sacrificial anode material.

(Manufacturing of Brazing Filler Material)

Similarly to Example A, the ingots of the aluminum alloys for brazing filler material of R1-R3 having the composition illustrated in Table 3 were made by a continuous casting method, were subjected to scalping and homogenizing treatment according to necessity, were hot rolled to a predetermined sheet thickness, and were made the sheet materials for the brazing filler material.

(Manufacturing of Aluminum Alloy Brazing Sheet)

Either sheet material for sacrificial anode material among G101-G113 was overlaid on one side face of either sheet material for core material among S101-S123 manufactured so that the clad ratio became 20%, either sheet material for brazing filler material among R1-R3 was overlaid on the other side face of the sheet material for core material so that the clad ratio became 15%, and were roll bonded by hot rolling to be made the sheet material. Thereafter, the sheet material was subjected to cold rolling, intermediate annealing and final cold rolling to be made the sheet material to be made the sheet material with 0.25 mm sheet thickness. Also, final annealing was performed after final cold rolling.

Further, intermediate annealing and final annealing treatment were performed in accordance with the conditions illustrated in Tables 14 and 15.

Next, the aluminum alloy brazing sheets manufactured by the above-mentioned method were made specimens, the number density [piece/$\mu m^2$], high frequency weldability, post-braze strength, brazability, and corrosion resistance of the Al—Cu-based intermetallic compounds of the specimens were measured and evaluated in accordance with the method described above, and the results of them were illustrated in Tables 14 and 15.

Also, in Tables 14 and 15, those on which measurement and evaluation were impossible and those on which measurement and evaluation were not conducted were shown by "-".

Similarly to Example A, those evaluated to be good with respect to all of the evaluation points were determined to be the example satisfying the requirements of the present invention, whereas those evaluated to be poor with respect to at least either one of the evaluation points were determined to be the comparative example not satisfying the requirements of the present invention.

(Number Density of Al—Cu-Based Intermetallic Compounds)

The number density of the Al—Cu-based intermetallic compounds was measured by manufacturing a sample for observing the center part of the core material by mechanical polishing and electrolytic etching and observing the structure using a transmission electron microscope. The membrane thickness of the observed portion was measured from equal thickness interference fringes, and the observed location was limited to the locations where the membrane thickness was 0.1-0.3 μm. In the observed locations, the Al—Cu-based intermetallic compounds were observed at a magnification of 10,000 times, and the number density of the Al—Cu-based intermetallic compounds per unit area ($\mu m^2$) was measured using image processing.

As illustrated in Table 14, the brazing sheets of the examples of Nos. 101-120 satisfied the requirements of the present invention, and were therefore evaluated to be good in the high frequency weldability, post-braze strength, brazability and corrosion resistance.

On the other hand, as illustrated in Table 15, the brazing sheets of the comparative examples of Nos. 101-123 did not satisfy any of the requirements stipulated in the present invention, and therefore were not evaluated to be good.

More specifically, in the brazing sheet of the comparative example No. 101, because the temperature of intermediate annealing was high, the brazing filler material was melted in intermediate annealing, and manufacturing was impossible.

In the brazing sheets of the comparative examples of Nos. 102-107, the number density of the Al—Cu-based intermetallic compounds with 0.5 μm or above particle size inside the core material exceeded 1.0 piece/$\mu m^2$, therefore local excessive melting occurred in high frequency welding, and therefore the high frequency weldability resulted to be poor.

In the brazing sheet of the comparative example No. 108, because Si in the core material was below 0.1 mass %, the post-braze strength was low. Also, in the brazing sheet of the comparative example No. 109, because Si in the core material exceeded 1.0 mass %, the core material was molten in heating for brazing, and the post-braze strength could not be measured.

In the brazing sheet of the comparative example No. 110, because Cu in the core material was below 0.5 mass %, the post-braze strength was low. Also, in the brazing sheet of the comparative example No. 111, because Cu in the core material exceeded 1.2 mass %, the core material was molten in heating for brazing, and the post-braze strength could not be measured.

In the brazing sheet of the comparative example No. 112, because Mn in the core material was below 0.5 mass %, the post-braze strength was low. Also, in the brazing sheet of the comparative example No. 113, because Mn in the core material exceeded 2.0 mass %, the corrosion resistance resulted to be poor.

In the brazing sheet of the comparative example No. 114, because Cr in the core material exceeded 0.25 mass %, the corrosion resistance resulted to be poor.

In the brazing sheet of the comparative example No. 115, because Ti in the core material was below 0.05 mass %, the corrosion resistance resulted to be poor. Also, in the brazing sheet of the comparative example No. 116, because Ti in the core material exceeded 0.25 mass %, the corrosion resistance resulted to be poor.

In the brazing sheet of the comparative example No. 117, because Mg in the core material exceeded 0.5 mass %, the brazability resulted to be poor.

In the brazing sheet of the comparative example No. 118, because Si in the sacrificial anode material was 0.2 mass % or below, the post-braze strength was low. Also, in the brazing sheet of the comparative example No. 119, because Si in the sacrificial anode material exceeded 0.8 mass %, the sacrificial anode material was molten in heating for brazing, and the post-braze strength could not be measured.

In the brazing sheet of the comparative example No. 120, because Zn in the sacrificial anode material was 3.0 mass % or below, the corrosion resistance resulted to be poor. Also, in the brazing sheet of the comparative example No. 121, because Zn in the sacrificial anode material exceeded 5.0 mass %, the sacrificial anode material was molten in heating for brazing, and the post-braze strength could not be measured.

In the brazing sheet of the comparative example No. 122, because Mg in the sacrificial anode material was below 1.0 mass %, the post-braze strength was low. Also, in the brazing sheet of the comparative example No. 123, because Mg in the sacrificial anode material exceeded 4.5 mass %, the side material could not be claded on the core material, and the test could not be conducted.

Also, the brazing sheets of the comparative examples of Nos. 110 and 111 are those assuming the conventional brazing sheets described in Japanese Patent No. 3276790 (see the paragraph 0013) or Japanese Patent No. 2564190 (see the column in the right in p. 2). As illustrated in the example B, these conventional brazing sheets do not satisfy a predetermined level with respect to one or more among the post-braze strength, brazability, corrosion resistance, and high frequency weldability. Accordingly, it was clarified objectively by the present example that the brazing sheets in relation with the present invention were superior in comparison with the conventional brazing sheets.

The aluminum alloy brazing sheet in relation with the present invention was described above concretely by the embodiments and examples, however the purpose of the present invention is not limited to these descriptions and is to be interpreted widely based on the description of claims of the patent. Also, it is a matter of course that those variously changed, altered and the like based on these descriptions are to be included in the purpose of the present invention.

TABLE 1

| | Core material composition | | | | | | | |
|---|---|---|---|---|---|---|---|---|
| | | mass % | | | | | | |
| | No. | Si | Cu | Mn | Ti | Cr | Mg | Remarks |
| Example | S1 | 0.15 | 1.15 | 1.55 | — | — | — | — |
| | S2 | 0.10 | 1.20 | 1.55 | — | 0.10 | — | — |
| | S3 | 0.35 | 1.20 | 1.20 | — | 0.25 | — | — |
| | S4 | 0.40 | 1.05 | 1.15 | 0.10 | 0.10 | — | — |
| | S5 | 0.70 | 0.90 | 1.05 | 0.25 | — | — | — |
| | S6 | 0.62 | 1.05 | 1.20 | — | — | 0.05 | — |
| | S7 | 0.60 | 0.70 | 1.10 | — | — | 0.50 | — |
| | S8 | 0.60 | 0.75 | 1.60 | — | — | — | — |
| | S9 | 0.85 | 0.65 | 0.55 | — | 0.05 | — | — |
| | S10 | 0.80 | 0.50 | 0.50 | 0.10 | 0.10 | — | — |
| | S11 | 1.00 | 0.55 | 1.80 | 0.20 | — | 0.25 | — |
| | S12 | 0.95 | 0.65 | 2.00 | 0.10 | 0.05 | 0.15 | — |
| Comparative example | S13 | 0.05 | 0.65 | 1.60 | — | — | — | Si: below lower limit |
| | S14 | 1.05 | 0.60 | 1.00 | — | — | — | Si: over upper limit |
| | S15 | 0.40 | 0.45 | 1.45 | — | 0.10 | 0.10 | Cu: below lower limit |
| | S16 | 0.21 | 1.25 | 1.40 | 0.10 | — | — | Cu: over upper limit |
| | S17 | 0.44 | 1.20 | 0.45 | — | — | 0.20 | Mn: below lower limit |
| | S18 | 0.40 | 1.15 | 2.05 | — | — | — | Mn: over upper limit |
| | S19 | 0.50 | 1.10 | 0.80 | — | 0.30 | — | Cr: over upper limit |
| | S20 | 0.55 | 1.05 | 0.70 | 0.03 | 0.05 | — | Ti: below lower limit |
| | S21 | 0.80 | 0.70 | 1.20 | 0.28 | 0.20 | — | Ti: over upper limit |
| | S22 | 0.10 | 0.70 | 1.30 | — | — | 0.55 | Mg: over upper limit |

TABLE 2

| Sacrificial anode material composition | | | | | |
|---|---|---|---|---|---|
| | | Sacrificial anode material (mass %) | | | |
| | No. | Si | Zn | Mg | Remarks |
| Example | G1 | 0.25 | 5.00 | 1.00 | |
| | G2 | 0.21 | 5.00 | 4.00 | |
| | G3 | 0.45 | 3.50 | 1.50 | |
| | G4 | 0.40 | 3.50 | 4.50 | |
| | G5 | 0.70 | 3.50 | 3.05 | |
| | G6 | 0.80 | 3.05 | 4.50 | |
| | G7 | 0.80 | 3.05 | 3.00 | |
| Comparative example | G8 | 0.15 | 3.05 | 3.50 | Si: lower limit or below |
| | G9 | 0.85 | 3.05 | 3.70 | Si: over upper limit |
| | G10 | 0.65 | 2.90 | 2.50 | Zn: lower limit or below |
| | G11 | 0.60 | 5.10 | 2.20 | Zn: over upper limit |

TABLE 2-continued

| Sacrificial anode material composition | | | | |
|---|---|---|---|---|
| | Sacrificial anode material (mass %) | | | |
| No. | Si | Zn | Mg | Remarks |
| G12 | 0.40 | 4.20 | 0.90 | Mg: below lower limit |
| G13 | 0.45 | 4.05 | 4.60 | Mg: over upper limit |

TABLE 3

| Filler material composition | |
|---|---|
| No. | Filler material (mass %) Si |
| R1 | 7.0 |
| R2 | 10.0 |
| R3 | 12.0 |

TABLE 4

| Example | | | | | | | | | | | |
|---|---|---|---|---|---|---|---|---|---|---|---|
| | | | | Final annealing condition | | | Area fraction of Mg—Zn-based | | | | Corrosion |
| No. | Sacrificial anode material | Core material | Filler material | Temperature [° C.] | Time | Cooling rate [° C./min] | intermetallic compounds of 2 µm or above (%) | High frequency weldability | Post-braze strength | Brazability | resistance (inner surface side) |
| 1 | G1 | S1 | R1 | 250 | 10 | 5 | 0.92 | Good | Good | Good | Good |
| 2 | G2 | S1 | R1 | 250 | 10 | 5 | 0.96 | Good | Good | Good | Good |
| 3 | G3 | S2 | R1 | 250 | 6 | 5 | 0.65 | Good | Good | Good | Good |
| 4 | G4 | S2 | R1 | 310 | 4 | 5 | 0.66 | Good | Good | Good | Good |
| 5 | G5 | S3 | R1 | 310 | 4 | 5 | 0.62 | Good | Good | Good | Good |
| 6 | G6 | S3 | R2 | 310 | 4 | 10 | 0.63 | Good | Good | Good | Good |
| 7 | G7 | S4 | R2 | 310 | 4 | 10 | 0.58 | Good | Good | Good | Good |
| 8 | G1 | S4 | R2 | 310 | 4 | 10 | 0.58 | Good | Good | Good | Good |
| 9 | G2 | S5 | R2 | 310 | 4 | 10 | 0.67 | Good | Good | Good | Good |
| 10 | G3 | S5 | R2 | 310 | 4 | 10 | 0.55 | Good | Good | Good | Good |
| 11 | G4 | S6 | R2 | 310 | 4 | 10 | 0.64 | Good | Good | Good | Good |
| 12 | G5 | S6 | R2 | 450 | 4 | 15 | 0.80 | Good | Good | Good | Good |
| 13 | G6 | S7 | R2 | 450 | 4 | 15 | 0.83 | Good | Good | Good | Good |
| 14 | G7 | S7 | R2 | 450 | 4 | 15 | 0.79 | Good | Good | Good | Good |
| 15 | G1 | S8 | R2 | 450 | 4 | 15 | 0.79 | Good | Good | Good | Good |
| 16 | G2 | S9 | R3 | 450 | 4 | 15 | 0.88 | Good | Good | Good | Good |
| 17 | G3 | S10 | R3 | 450 | 4 | 15 | 0.76 | Good | Good | Good | Good |
| 18 | G4 | S11 | R3 | 500 | 1 | 20 | 0.40 | Good | Good | Good | Good |
| 19 | G5 | S12 | R3 | 500 | 1 | 20 | 0.36 | Good | Good | Good | Good |
| 20 | G6 | S12 | R3 | 500 | 1 | 20 | 0.39 | Good | Good | Good | Good |

TABLE 5

| Comparative example | | | | | | | | | | | | |
|---|---|---|---|---|---|---|---|---|---|---|---|---|
| | Sacri-ficial | | | Final annealing condition | | | Area fraction of Mg—Zn-based intermetallic | fre- | | | Corro-sion resis-tance | |
| No | anode mate-rial | Core mate-rial | Filler mate-rial | Temper-ature [° C.] | Time [hr] | Cooling rate [° C./min] | compounds of 2 µm or above (%) | quency welda-bility | Post-braze strength | Brazability | (inner surface side) | Remarks |
| 1 | G1 | S1 | R1 | 260 | 11 | 10 | 1.25 | Poor | — | — | — | Area fraction: over upper limit |
| 2 | G1 | S1 | R1 | 520 | 5 | 10 | 1.17 | Poor | — | — | — | Area fraction: over upper limit |
| 3 | G1 | S1 | R1 | 260 | 6 | 4 | 1.09 | Poor | — | — | — | Area fraction: over upper limit |

TABLE 5-continued

| Comparative example | | | | | | | | | | | | | |
|---|---|---|---|---|---|---|---|---|---|---|---|---|---|
| No | Sacrificial anode material | Core material | Filler material | Final annealing condition Temperature [° C.] | Time [hr] | Cooling rate [° C./min] | Area fraction of Mg—Zn-based intermetallic compounds of 2 μm or above (%) | frequency weldability | Post-braze strength | Brazability | Corrosion resistance (inner surface side) | Remarks |
| 4 | G1 | S13 | R1 | 260 | 6 | 10 | 0.68 | Good | Poor | — | — | Core material Si: below lower limit |
| 5 | G1 | S14 | R1 | 260 | 6 | 10 | 0.68 | Good | — | — | — | Core material Si: over upper limit |
| 6 | G1 | S15 | R1 | 260 | 6 | 10 | 0.68 | Good | Poor | — | — | Core material Cu: below lower limit |
| 7 | G1 | S16 | R2 | 260 | 6 | 10 | 0.68 | Good | — | — | — | Core material Cu: over upper limit |
| 8 | G1 | S17 | R2 | 260 | 6 | 10 | 0.68 | Good | Poor | — | — | Core material Mn: below lower limit |
| 9 | G1 | S18 | R2 | 260 | 6 | 10 | 0.69 | Good | Good | Good | Poor | Core material Mn: over upper limit |
| 10 | G1 | S19 | R2 | 310 | 4 | 10 | 0.58 | Good | Good | Good | Poor | Core material Cr: over upper limit |
| 11 | G1 | S20 | R2 | 310 | 4 | 10 | 0.58 | Good | Good | Good | Poor | Core material Ti: below lower limit |
| 12 | G1 | S21 | R2 | 310 | 4 | 10 | 0.58 | Good | Good | Good | Poor | Core material Ti: over upper limit |
| 13 | G1 | S22 | R2 | 450 | 4 | 10 | 0.79 | Good | Good | Poor | — | Core material Mg: over upper limit |
| 14 | G8 | S1 | R2 | 450 | 4 | 10 | 0.80 | Good | Poor | — | — | Sacrificial anode material Si: lower limit or below |
| 15 | G9 | S1 | R3 | 450 | 4 | 10 | 0.81 | Good | — | — | — | Sacrificial anode material Si: over upper limit |
| 16 | G10 | S1 | R3 | 450 | 4 | 10 | 0.77 | Good | Good | Good | Poor | Sacrificial anode material Zn: lower limit or below |
| 17 | G11 | S1 | R3 | 500 | 2 | 10 | 0.54 | Good | — | — | — | Sacrificial anode material Zn: over upper limit |
| 18 | G12 | S1 | R3 | 500 | 2 | 10 | 0.48 | Good | Poor | — | — | Sacrificial anode material Mg: below lower limit |
| 19 | G13 | 51 | R3 | — | — | — | — | — | — | — | — | Sacrificial anode material Mg: over upper limit |
| 20 | G11 | S15 | R3 | 500 | 2 | 10 | 0.61 | Good | — | — | — | Core material Cu: below lower limit Sacrificial anode material Zn: over upper limit |

TABLE 11

| Core material composition | | | | | | | | |
|---|---|---|---|---|---|---|---|---|
| | No. | Si | Cu | Mn | Cr | Ti | Mg | Remarks |
| Example | S101 | 1.00 | 0.50 | 2.00 | — | — | — | — |
| | S102 | 0.95 | 0.55 | 1.90 | 0.10 | — | — | — |
| | S103 | 0.20 | 1.20 | 1.20 | 0.25 | — | — | — |
| | S104 | 0.45 | 0.95 | 1.50 | 0.10 | 0.10 | — | — |
| | S105 | 0.60 | 0.50 | 0.60 | — | 0.25 | — | — |
| | S106 | 0.60 | 0.50 | 1.50 | — | — | 0.05 | — |
| | S107 | 0.80 | 0.75 | 1.60 | — | — | 0.50 | — |
| | S108 | 0.85 | 0.65 | 1.60 | — | — | — | — |
| | S109 | 0.10 | 0.60 | 0.80 | 0.05 | — | — | — |
| | S110 | 0.15 | 0.60 | 0.80 | 0.10 | 0.10 | — | — |
| | S111 | 0.25 | 0.50 | 1.20 | — | 0.20 | 0.25 | — |
| | S112 | 0.55 | 0.85 | 1.20 | 0.05 | 0.10 | 0.15 | — |
| Comparative example | S113 | 0.05 | 0.55 | 1.10 | — | — | — | Si: below lower limit |
| | S114 | 1.05 | 0.75 | 0.50 | — | — | — | Si: over upper limit |
| | S115 | 0.35 | 0.45 | 1.40 | 0.10 | — | 0.05 | Cu: below lower limit |

TABLE 11-continued

| Core material composition | | | | | | | |
|---|---|---|---|---|---|---|---|
| No. | Si | Cu | Mn | Cr | Ti | Mg | Remarks |
| S116 | 0.90 | 1.25 | 1.10 | — | 0.10 | — | Cu: over upper limit |
| S117 | 0.20 | 0.60 | 0.45 | — | — | 0.20 | Mn: below lower limit |
| S118 | 0.60 | 1.10 | 2.05 | — | — | — | Mn: over upper limit |
| S119 | 0.50 | 1.10 | 1.00 | 0.30 | — | — | Cr: over upper limit |
| S120 | 0.55 | 0.90 | 1.20 | 0.05 | 0.03 | — | Ti: below lower limit |
| S121 | 0.80 | 0.90 | 1.10 | 0.20 | 0.28 | — | Ti: over upper limit |
| S122 | 0.10 | 0.95 | 1.70 | — | — | 0.55 | Mg: over upper limit |

TABLE 12

| Sacrificial anode material composition | | | | | |
|---|---|---|---|---|---|
| | | Sacrificial anode material (mass %) | | | |
| | No. | Si | Zn | Mg | Remarks |
| Example | G101 | 0.21 | 4.80 | 2.00 | |
| | G102 | 0.40 | 5.00 | 3.00 | |
| | G103 | 0.50 | 3.80 | 1.00 | |
| | G104 | 0.50 | 3.15 | 4.00 | |
| | G105 | 0.65 | 2.05 | 4.50 | |
| | G106 | 0.75 | 4.50 | 3.00 | |
| | G107 | 0.80 | 4.00 | 1.50 | |

TABLE 12-continued

| Sacrificial anode material composition | | | | | |
|---|---|---|---|---|---|
| | | Sacrificial anode material (mass %) | | | |
| | No. | Si | Zn | Mg | Remarks |
| Comparative example | G108 | 0.15 | 3.00 | 3.00 | Si: lower limit or below |
| | G109 | 0.85 | 3.50 | 3.50 | Si: over upper limit |
| | G110 | 0.50 | 1.90 | 2.00 | Zn: lower limit or below |
| | G111 | 0.40 | 5.10 | 3.00 | Zn: over upper limit |
| | G112 | 0.70 | 4.00 | 0.90 | Mg: below lower limit |
| | G113 | 0.65 | 3.50 | 4.60 | Mg: over upper limit |

TABLE 14

| Example | | | | | | | | | | | | | | | |
|---|---|---|---|---|---|---|---|---|---|---|---|---|---|---|---|
| | | | | Intermediate annealing condition | | | Final annealing condition | | | | | | | | |
| No. | Sacrificial anode material | core material | Brazing filler material | Temperature [° C.] | Time [s] | Cooling rate [° C./min] | Temperature [° C.] | time [hr] | cooling rate [° C./min] | Number density of Al—Cu-based intermetallic compounds of 0.5 µm or above (piece/µm$_2$) | High frequency weldability | Post-braze strength | Brazability | Corrosion resistance (inner face side) |
| 101 | G101 | S101 | R1 | 450 | 0.8 | 1.0 | 300 | 10 | 30 | 0.94 | Good | Good | Good | Good |
| 102 | G102 | S101 | R1 | 450 | 0.8 | 1.0 | 250 | 10 | 30 | 0.75 | Good | Good | Good | Good |
| 103 | G103 | S102 | R1 | 450 | 0.8 | 1.0 | 300 | 6 | 30 | 0.67 | Good | Good | Good | Good |
| 104 | G104 | S102 | R1 | 450 | 0.8 | 1.0 | 250 | 4 | 30 | 0.37 | Good | Good | Good | Good |
| 105 | G105 | S103 | R1 | 450 | 0.8 | 1.0 | 300 | 4 | 30 | 0.62 | Good | Good | Good | Good |
| 106 | G106 | S103 | R2 | 450 | 0.8 | 1.0 | 250 | 4 | 30 | 0.50 | Good | Good | Good | Good |
| 107 | G107 | S104 | R2 | 450 | 0.8 | 1.0 | 300 | 4 | 30 | 0.57 | Good | Good | Good | Good |
| 108 | G101 | S104 | R2 | 350 | 0.9 | 4.0 | 250 | 4 | 40 | 0.45 | Good | Good | Good | Good |
| 109 | G102 | S105 | R2 | 350 | 0.9 | 4.0 | 400 | 4 | 40 | 0.77 | Good | Good | Good | Good |
| 110 | G103 | S105 | R2 | 350 | 0.9 | 4.0 | 350 | 4 | 40 | 0.61 | Good | Good | Good | Good |
| 111 | G104 | S106 | R2 | 350 | 0.9 | 4.0 | 400 | 4 | 40 | 0.77 | Good | Good | Good | Good |
| 112 | G105 | S106 | R2 | 350 | 0.9 | 4.0 | 350 | 4 | 40 | 0.61 | Good | Good | Good | Good |
| 113 | G106 | S107 | R2 | 350 | 0.9 | 4.0 | 400 | 4 | 40 | 0.82 | Good | Good | Good | Good |
| 114 | G107 | S107 | R2 | 350 | 0.9 | 4.0 | 350 | 4 | 40 | 0.66 | Good | Good | Good | Good |
| 115 | G101 | S108 | R2 | 550 | 0.2 | 6.0 | 400 | 4 | 50 | 0.80 | Good | Good | Good | Good |
| 116 | G102 | S109 | R3 | 550 | 0.2 | 6.0 | 350 | 4 | 50 | 0.63 | Good | Good | Good | Good |
| 117 | G103 | S110 | R3 | 550 | 0.2 | 6.0 | 400 | 4 | 50 | 0.79 | Good | Good | Good | Good |
| 118 | G104 | S111 | R3 | 550 | 0.2 | 6.0 | 350 | 2 | 50 | 0.36 | Good | Good | Good | Good |
| 119 | G105 | S112 | R3 | 550 | 0.2 | 6.0 | 400 | 2 | 50 | 0.50 | Good | Good | Good | Good |
| 120 | G106 | S112 | R3 | 550 | 0.2 | 6.0 | 350 | 2 | 50 | 0.43 | Good | Good | Good | Good |

TABLE 15

| Comparative example | | | | | | | | | | | | |
|---|---|---|---|---|---|---|---|---|---|---|---|---|
| | | | | Intermediate annealing condition | | | Final annealing condition | | | | | |
| No. | Sacrificial anode material | Core material | Brazing filler material | Temperature [° C.] | Time [s] | Cooling rate [° C./min] | Temperature [° C.] | Time [hr] | Cooling rate [° C./min] | Number density of Al—Cu-based intermetallic compounds of 0.5 µm or above (piece/µm2) | High frequency weldability | Post-braze strength |
| 101 | G101 | S101 | R1 | 560 | 0.2 | 4.0 | — | — | — | — | — | — |
| 102 | G101 | S101 | R1 | 340 | 0.6 | 4.0 | 350 | 4 | 30 | 1.24 | Poor | — |
| 103 | G101 | S101 | R1 | 450 | 1.2 | 4.0 | 350 | 4 | 30 | 1.21 | Poor | — |
| 104 | G101 | S101 | R1 | 450 | 0.8 | 0.8 | 350 | 4 | 30 | 1.19 | Poor | — |
| 105 | G101 | S101 | R1 | 450 | 0.8 | 4.0 | 300 | 11 | 30 | 1.23 | Poor | — |
| 106 | G101 | S101 | R1 | 450 | 0.8 | 4.0 | 420 | 5 | 30 | 1.12 | Poor | — |
| 107 | G101 | S101 | R1 | 450 | 0.8 | 4.0 | 260 | 6 | 25 | 1.11 | Poor | — |
| 108 | G101 | S113 | R1 | 450 | 0.8 | 4.0 | 350 | 4 | 30 | 0.62 | Good | Poor |
| 109 | G101 | S114 | R1 | 450 | 0.8 | 4.0 | 350 | 4 | 30 | 0.66 | Good | — |
| 110 | G101 | S115 | R1 | 450 | 0.8 | 4.0 | 350 | 4 | 30 | 0.60 | Good | Poor |
| 111 | G101 | S116 | R2 | 450 | 0.8 | 4.0 | 250 | 4 | 30 | 0.51 | Good | — |

TABLE 15-continued

| | | | | | | | | | | | | |
|---|---|---|---|---|---|---|---|---|---|---|---|---|
| 112 | G101 | S117 | R2 | 450 | 0.8 | 4.0 | 250 | 4 | 30 | 0.38 | Good | Poor |
| 113 | G101 | S118 | R2 | 450 | 0.8 | 4.0 | 250 | 4 | 30 | 0.72 | Good | Good |
| 114 | G101 | S119 | R2 | 450 | 0.8 | 4.0 | 250 | 5 | 40 | 0.55 | Good | Good |
| 115 | G101 | S120 | R2 | 450 | 0.8 | 4.0 | 250 | 5 | 40 | 0.51 | Good | Good |
| 116 | G101 | S121 | R2 | 450 | 0.8 | 4.0 | 300 | 5 | 40 | 0.65 | Good | Good |
| 117 | G101 | S122 | R2 | 450 | 0.8 | 4.0 | 300 | 5 | 40 | 0.66 | Good | Good |
| 118 | G108 | S101 | R2 | 450 | 0.8 | 4.0 | 400 | 5 | 40 | 0.93 | Good | Poor |
| 119 | G109 | S101 | R3 | 450 | 0.8 | 4.0 | 400 | 3 | 40 | 0.60 | Good | — |
| 120 | G110 | S101 | R3 | 450 | 0.8 | 4.0 | 400 | 3 | 40 | 0.60 | Good | Good |
| 121 | G111 | S101 | R3 | 450 | 0.8 | 4.0 | 350 | 3 | 40 | 0.48 | Good | — |
| 122 | G112 | S101 | R3 | 450 | 0.8 | 4.0 | 350 | 3 | 40 | 0.48 | Good | Poor |
| 123 | G113 | S101 | R3 | 450 | 0.8 | 4.0 | — | — | — | — | — | — |

| Comparative example | | | | |
|---|---|---|---|---|
| No. | Post-braze strength | Braze-ability | Corrosion resistance (inner face side) | Remarks |
| 101 | — | — | — | Manufacturing impossible |
| 102 | — | — | — | Number density: over upper limit |
| 103 | — | — | — | Number density: over upper limit |
| 104 | — | — | — | Number density: over upper limit |
| 105 | — | — | — | Number density: over upper limit |
| 106 | — | — | — | Number density: over upper limit |
| 107 | — | — | — | Number density: over upper limit |
| 108 | Poor | — | — | Core material Si: below lower limit |
| 109 | — | — | — | Core material Si: over upper limit |
| 110 | Poor | — | — | Core material Cu: below lower limit |
| 111 | — | — | — | Core material Cu: over upper limit |
| 112 | Poor | — | — | Core material Mn: below lower limit |
| 113 | Good | Good | Poor | Core material Mn: over upper limit |
| 114 | Good | Good | Poor | Core material Cr: over upper limit |
| 115 | Good | Good | Poor | Core material Ti: below lower limit |
| 116 | Good | Good | Poor | Core material Ti: over upper limit |
| 117 | Good | Poor | — | Core material Mg: over upper limit |
| 118 | Poor | — | — | Sacrificial anode material Si: lower limit or below |
| 119 | — | — | — | Sacrificial anode material Si: over upper limit |
| 120 | Good | Good | Poor | Sacrificial anode material Zn: lower limit or below |
| 121 | — | — | — | Sacrificial anode material Zn: over upper limit |
| 122 | Poor | — | — | Sacrificial anode material Mg: below lower limit |
| 123 | — | — | — | Sacrificial anode material Mg: over upper limit |

What is claimed is:

1. An aluminum alloy brazing sheet comprising:

a core material containing Si: 0.1-1.0 mass %, Cu: 0.5-1.2 mass %, and Mn: 0.5-2.0 mass %, the balance being Al and inevitable impurities;

a sacrificial anode material disposed on one face side of the core material and containing Si: exceeding 0.2 mass % and 0.8 mass % or below, Zn: exceeding 3.0 mass % and 5.0% or below, and Mg: 1.0-4.5 mass %, the balance being Al and inevitable impurities; and a brazing filler material disposed on the other face side of the core material and formed of an aluminum alloy, wherein an area fraction of Zn—Mg-based intermetallic compounds with 2.0 μm or above particle size on a surface of the sacrificial anode material is 1.0% or below.

2. An aluminum alloy brazing sheet comprising:

a core material containing Si: 0.1-1.0 mass %, Cu: 0.5-1.2 mass %, and Mn: 0.5-2.0 mass %, the balance being Al and inevitable impurities;

a sacrificial anode material disposed on one face side of the core material and containing Si: exceeding 0.2 mass % and 0.8 mass % or below, Zn: exceeding 3.0 mass % and 5.0% or below, and Mg: 1.0-4.5 mass %, the balance being Al and inevitable impurities; and a brazing filler material disposed on the other face side of the core material and formed of an aluminum alloy, wherein a number density of Al-Cu-based intermetallic compounds with 0.5 μm or above particle size inside the core material is 1.0 piece/$\mu m^2$ or below.

3. The aluminum alloy brazing sheet according to claim 1, wherein the core material further contains one or more element selected from a group consisting of Ti:

0.05-025 mass %, Cr: 0.25 mass % or below, and Mg: 0.5 mass % or below.

4. The aluminum alloy brazing sheet according to claim 2, wherein the core material further contains one or more element selected from a group consisting of Ti:

0.05-0.25 mass %, Cr: 0.25 mass % or below, and Mg: 0.5 mass % or below.

5. The aluminum alloy brazing sheet of claim 1, wherein the aluminum alloy of the brazing filler material comprises Si.

6. The aluminum alloy brazing sheet of claim 2, wherein the aluminum alloy of the brazing filler material comprises Si.

7. The aluminum alloy brazing sheet of claim 5, wherein the aluminum alloy of the brazing filler material further comprises Zn.

8. The aluminum alloy brazing sheet of claim 6, wherein the aluminum alloy of the brazing filler material further comprises Zn.

9. The aluminum alloy brazing sheet of claim 5, wherein a content of Si in the aluminum alloy of the brazing filler material is from 7% to 12% by mass.

10. The aluminum alloy brazing sheet of claim 6, wherein a content of Si in the aluminum alloy of the brazing filler material is from 7% to 12% by mass.

* * * * *